United States Patent
Lynch

(10) Patent No.: US 11,752,633 B1
(45) Date of Patent: Sep. 12, 2023

(54) MANIPULATOR SYSTEM

(71) Applicant: Stephen B. Lynch, Portola Valley, CA (US)

(72) Inventor: Stephen B. Lynch, Portola Valley, CA (US)

(73) Assignee: APPLE INC., Cupertino, CA (US)

( * ) Notice: Subject to any disclaimer, the term of this patent is extended or adjusted under 35 U.S.C. 154(b) by 641 days.

(21) Appl. No.: 16/716,581

(22) Filed: Dec. 17, 2019

Related U.S. Application Data

(60) Provisional application No. 62/799,151, filed on Jan. 31, 2019.

(51) Int. Cl.
   *B25J 9/16* (2006.01)
   *B25J 5/00* (2006.01)
   *B60P 3/00* (2006.01)

(52) U.S. Cl.
   CPC .............. *B25J 9/1694* (2013.01); *B25J 5/007* (2013.01); *B60P 3/007* (2013.01)

(58) Field of Classification Search
   CPC ....... B25J 9/1697; B25J 9/1664; B25J 9/1679; B25J 9/042; B25J 9/023; B25J 9/162; B25J 9/1661; B25J 9/1694; B25J 5/007; B25J 5/00; B25J 11/00; B25J 11/008; B25J 11/0095; B25J 11/005; B25J 11/0045; B25J 19/023; B25J 15/08; B25J 15/0019; B25J 18/00; B60P 3/007
   See application file for complete search history.

(56) References Cited

U.S. PATENT DOCUMENTS

| | | | |
|---|---|---|---|
| 7,810,790 B2 * | 10/2010 | Kazerooni | B60R 5/04 414/466 |
| 7,967,347 B1 * | 6/2011 | Johnson | E05B 83/12 292/201 |
| 9,248,875 B2 * | 2/2016 | Wolf et al. | B62D 55/065 |
| 9,573,684 B2 | 2/2017 | Kimchi et al. | |
| 11,008,784 B2 * | 5/2021 | Fabre | E05B 81/56 |
| 11,097,484 B1 * | 8/2021 | Snyder et al. | B29C 64/379 |
| 2005/0131645 A1 | 6/2005 | Panopoulos | |
| 2009/0079217 A1 * | 3/2009 | Bakshi et al. | B60P 1/435 296/61 |
| 2015/0006005 A1 | 1/2015 | Yu et al. | |
| 2016/0167228 A1 * | 6/2016 | Wellman et al. | B25J 9/1602 901/3 |
| 2017/0068250 A1 | 3/2017 | Wiechers | |
| 2017/0106924 A1 * | 4/2017 | Hafenrichter et al. | B25J 15/0019 |
| 2018/0024554 A1 * | 1/2018 | Brady et al. | G06Q 10/0833 701/23 |
| 2018/0281657 A1 * | 10/2018 | Healey et al. | G06Q 10/08 |
| 2019/0033868 A1 * | 1/2019 | Ferguson et al. | B60P 3/007 |

FOREIGN PATENT DOCUMENTS

CN   106372827 A   2/2017

* cited by examiner

*Primary Examiner* — Khoi H Tran
*Assistant Examiner* — Nhi Q Bui
(74) *Attorney, Agent, or Firm* — Young Basile Hanlon & MacFarlane, P.C.

(57) ABSTRACT

A support structure connects a closure structure to a body for movement between a closed position in which the closure structure obstructs an opening and an open position in which the closure structure does not obstruct the opening. An actuator is operable to cause motion of the closure structure. A manipulator is connected to the closure structure and includes arm portions that are connected by actuated joints that are operable to move the arm portions with respect to each other and an end effector that is configured to pick up and release objects. Sensors output sensor signals and a controller is operable to cause motion of the closure structure to move the end effector relative to the objects based in part on the sensor signals.

21 Claims, 8 Drawing Sheets

MANIPULATOR SYSTEM

CROSS-REFERENCE TO RELATED APPLICATION(S)

This application claims the benefit of U.S. Provisional Application No. 62/799,151, filed on Jan. 31, 2019. The content of the foregoing application is incorporated herein by reference in its entirety for all purposes.

FIELD

The present disclosure relates generally to the field of actuators for manipulating objects.

BACKGROUND

Vehicles often transport objects, which need to be loaded into the vehicle and unloaded from the vehicle. In some circumstances, loading or unloading a vehicle may be difficult for a person. In some circumstances, a person may not be available to load or unload a vehicle.

SUMMARY

One aspect of the disclosure is a vehicle that includes a vehicle body, an opening defined in the vehicle body, a closure structure, and a support structure. The support structure connects the closure structure to the vehicle body such that the closure structure is movable with respect to the vehicle body between a closed position in which the closure structure obstructs the opening and an open position in which the closure structure does not obstruct the opening. An actuator is operable to cause motion of the closure structure with respect to the vehicle body. A manipulator is connected to the closure structure and includes arm portions that are connected by actuated joints that are operable to move the arm portions with respect to each other and an end effector that is configured to pick up and release objects. The vehicle also includes sensors that output sensor signals and a controller that is operable to cause motion of the closure structure to move the end effector relative to the objects based in part on the sensor signals.

In some implementations, the closure structure is pivotally connected to the vehicle body. In some implementations, the closure structure is slidably connected to the vehicle body. In some implementations, the actuated joints are operable to rotate the arm portions with respect to each other. In some implementations, the actuated joints are operable to translate the arm portions with respect to each other.

Another aspect of the disclosure is a vehicle that includes a vehicle body, an opening defined in the vehicle body, a closure structure, an actuator, and a manipulator. The closure structure is operable to move between open and closed positions with respect to the opening. The actuator that is operable to cause motion of the closure structure with respect to the vehicle body. The manipulator is connected to the closure structure and includes an end effector that is configured to pick up and release objects.

In some implementations, the vehicle includes a controller that is operable to cause motion of the closure structure to move the end effector relative to the objects. In some implementations, the vehicle includes sensors that are associated with the closure structure, wherein the controller is operable to control motion of the end effector based in part on sensor signals that are received from the sensors.

In some implementations, the closure structure is pivotally connected to the vehicle body. In some implementations, the closure structure is slidably connected to the vehicle body.

The manipulator may include arm portions that are connected by actuated joints that are operable to move the arm portions with respect to each other. In some implementations, the actuated joints are operable to rotate the arm portions with respect to each other. In some implementations, the actuated joints are operable to translate the arm portions with respect to each other.

In some implementations, the end effector is a mechanical gripper. In some implementations, the end effector is an electromagnetic gripper. In some implementations, the end effector is a pneumatic gripper.

In some implementations, the closure structure is a door. In some implementations, the closure structure is a tailgate. In some implementations, the closure structure is a liftgate.

Another aspect of the disclosure is a vehicle that includes a vehicle body, a first mounting structure, a second mounting structure, and a manipulator. The manipulator includes a first end effector, a second end effector, and arm portions that are connected by actuated joints that are operable to move the arm portions with respect to each other. The manipulator is moveable between a first configuration in which the first end effector is connected to the first mounting structure and the second end effector is able to pick up and release objects, and a second configuration in which the second end effector is connected to the second mounting structure and the first end effector is able to pick up and release the objects.

DETAILED DESCRIPTION

The disclosure herein relates to a vehicle that includes a manipulator system that is configured to load objects into the vehicle and unload objects from the vehicle. The manipulator system includes an end effector that is configured to engage the objects and one or more manipulator arm portions that are positionable to cause movement of the end effector.

In some implementations, the one or more manipulator arm portions are mounted to a closure structure of the vehicle. As examples, the closure structure may be a door, a hatch, or a tailgate. The closure structure includes an actuator that is operable to move the closure structure relative to a body of the vehicle (e.g., including movement between open and closed positions). Movement of the closure structure is controllable to change the position of an end effector of the manipulator. Thus, the closure structure of the vehicle provides and additional controllable degree of freedom for the manipulator system.

In some implementations, the manipulator system includes two end effectors that are positioned at opposite ends of the manipulator arm portions. The vehicle includes two or more mounting structures. The end effectors are each able to connect to one of the mounting structures. This allows the manipulator system to move between connections with different mounting structures.

Figure 1:
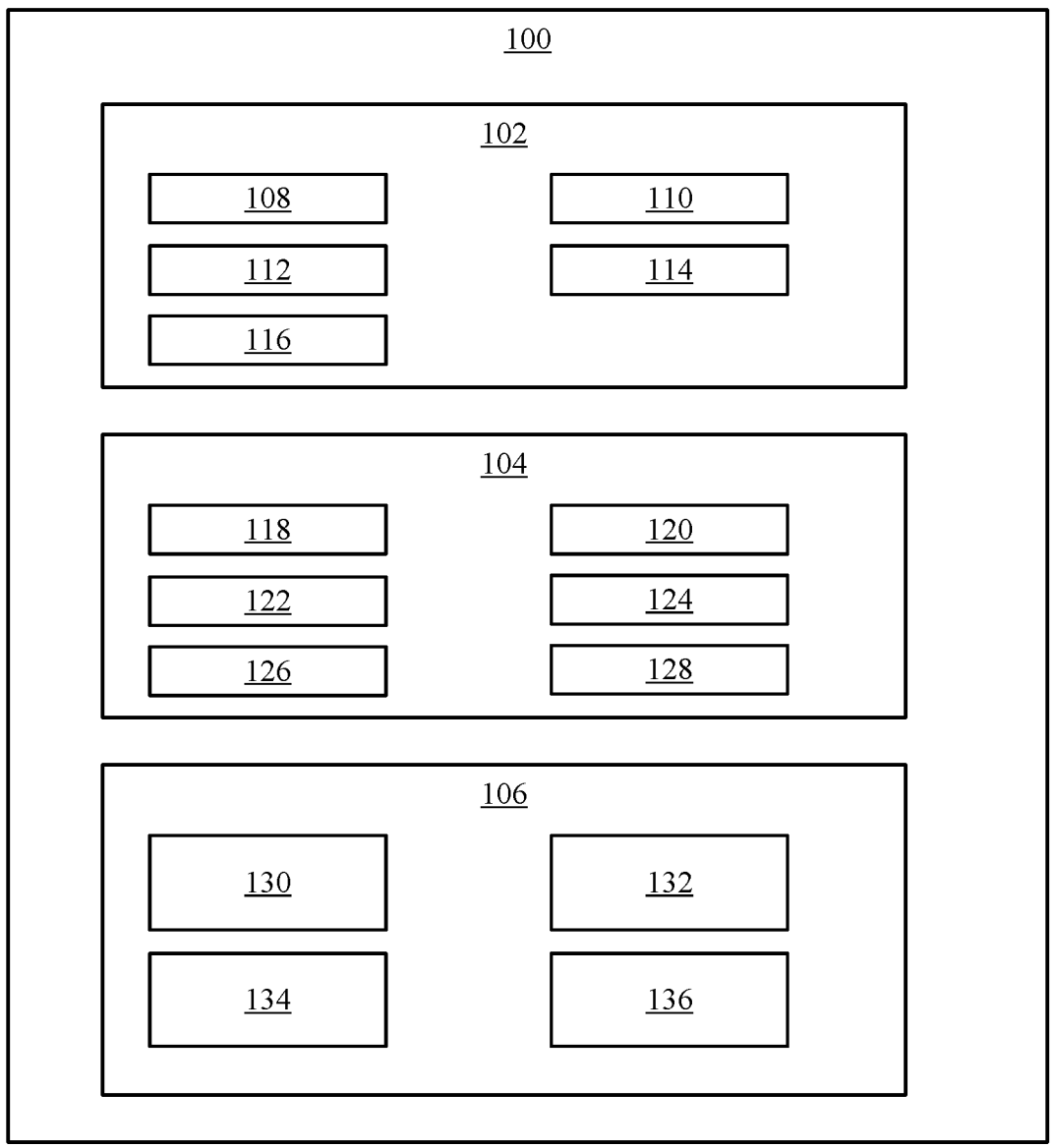
FIG. 1 is a block diagram that shows a vehicle.

FIG. 1 is a block diagram that shows a vehicle 100. The vehicle 100 includes a vehicle body 102, motion control components 104, and a manipulator 106.

The vehicle 100 may be a road-going vehicle. As an example, the vehicle 100 may be a car or a truck. The vehicle 100 may be configured primarily for transporting passengers, the vehicle 100 may be configured primarily for transporting cargo, or the vehicle 100 may be configured to transport passengers and/or cargo as needed.

The vehicle body 102 includes conventional components and may be implemented using any of several well-known structural configurations. As examples, the vehicle body 102 may be implemented using a body-on-frame configuration, a unibody configuration, a monocoque, or any other suitable configuration. The vehicle body 102 may define external surfaces for the vehicle 100, and the vehicle body 102 may define internal surfaces (e.g., facing an interior space such as a passenger compartment or a cargo compartment).

The vehicle body 102 defines an opening 108, and the vehicle 100 includes a closure structure 110 that is positionable in the opening 108. The closure structure 110 may be a structural panel that includes an exterior surface and an interior surface. The closure structure 110 is connected to the vehicle body 102 such that it is movable with respect to the vehicle body 102.

As one example, the closure structure 110 may be a door that is pivotally connected to the vehicle body 102. As another example, the closure structure 110 may be a door that is slidably connected to the vehicle body 102. As another example, the closure structure 110 may be a tailgate that is pivotally connected to the vehicle body 102. As another example, the closure structure 110 may be a liftgate (e.g., the rear door of a hatchback style vehicle or station wagon style vehicle) that is slidably connected to the vehicle body 102.

The closure structure 110 may be connected to the vehicle body 102 by a support structure 112. As one example, the support structure 112 may be or include one or more pivoting hinges that allow rotation of the closure structure 110 relative to the vehicle body 102. Rotational hinges could be connected to the vehicle body 102 and the closure structure 110, as example, in a generally vertical orientation (i.e., measured along the axis of the hinge), or in a generally horizonal orientation. As another example, the support structure 112 may be or include a track assembly that allows the closure structure 110 to translate relative to the vehicle body 102 by sliding along the track assembly.

An actuator 114 is operable to cause motion of the closure structure 110 with respect to the vehicle body 102. As an example, the actuator 114 may include an electric motor and may include associated components such as gear trains, linkages, sensors, etc. Operation of the actuator 114 may be controlled to allow positioning of the closure structure 110 at a desired position (i.e., at a desired translational position or at a desired angular orientation) with respect to the vehicle body 102.

The support structure 112 may support that closure structure 110 such that the closure structure 110 is movable with respect to the vehicle body 102 between a closed position and an open position relative to the vehicle body 102, and the actuator 114 may cause motion of the closure structure 110 relative to the vehicle body 102 between the open position and the closed position. In the closed position, the closure structure 110 obstructs the opening 108, and in the open position, the closure structure 110 does not obstruct the opening 108. Stated more generally, the open position of the closure structure 110 permits ingress and egress of persons and objects through the opening 108, while the closed position of the closure structure 110 blocks ingress and egress of persons and objects through the opening 108. The actuator 114 may also move the closure structure 110 to any desired position between the open position and the closed position.

Sensors 116 may be associated with the closure structure 110, such as by being located on the closure structure 110, or by being used to regulate motion of the closure structure 110. In particular, the sensors 116 may be operable to output sensor signals that describe conditions sensed by the sensors 116, such as the current position of the closure structure 110 or the presence and/or location of objects or persons near the vehicle 100. Examples of the sensors 116 include switches, position encoders, motion detectors, and cameras. Other types of sensing devices may be included among the sensors 116. As will be explained herein, in addition to use for opening and closing the closure structure 110, the sensors 116 may also be used to control operation of the manipulator 106.

The motion control components 104 are conventional systems of the vehicle 100 that allow motion of the vehicle 100. The motion control components 104 of the vehicle 100 may include, as examples, wheels 118 (e.g., including tires), steering components 120, propulsion components 122, braking components 124, a manual control system 126, and an autonomous control system 128. The steering components 120 are operable to change an angular orientation of one or more of the wheels 118. The propulsion components 122 are operable to apply propulsion torque to one or more of the wheels 118. The braking components 124 are operable to apply braking torque to one or more of the wheels 118. The manual control system 126 allows a human operator to exercise control over some of the motion control components 104, such as the steering components 120, the propulsion components 122, and the braking components 124. The autonomous control system 128 is a computer-implemented system that uses observations of the surrounding environment (e.g., using sensors) as a basis for exercising partial control or full control over some or all of the motion control components 104, such as the steering components 120, the propulsion components 122, and the braking components 124.

The manipulator 106 is operable to pick up and release objects. For example, the manipulator 106 may be used to load objects into the interior of the vehicle 100 from outside of the vehicle 100, and to unload objects to the outside of the vehicle 100 from the interior of the vehicle 100.

The manipulator 106 may include one or more arm portions 130, actuated joints 132, an end effector 134, and a controller 136. The manipulator 106 is connected to and supported by the closure structure 110. As a result, motion of the closure structure 110 (e.g., under control by the actuator 114) causes corresponding motion of the manipulator 106. This allows the closure structure 110 to be used for positioning the manipulator 106, including positioning of the end effector 134 at a desired position.

The arm portions 130 may be rigid or semi-rigid structures that are interconnected by the actuated joints 132. The actuated joints 132 are controllable devices that are operable to cause relative motion of the arm portions 130 with respect to each other, with respect to the closure structure 110 (i.e., by connection of one of the arm portions 130 to the closure structure 110 by one of the actuated joints 132), and/or with respect to the end effector 134 (i.e., by connection of one of the arm portions 130 to the end effector 134 by one of the actuated joints 132).

The end effector 134 is a device that is configured to interact with the environment around it, such as by picking up and releasing an object. There are many well-known end-effector designs that can be utilized as a basis for implementing the end effector 134. As one example, the end effector 134 may be a mechanical gripper such as a clamp. As another example, the end effector 134 may be an electromagnetic gripper and is operable to energize and deenergize to pick up and release objects that include ferromagnetic components. As another example, the end effector 134 may be a pneumatic gripper that is operable to pick up and release objects by applying and releasing suction (e.g., using a suction cup and a vacuum pump).

The controller 136 is operable to exercise control over motion of the manipulator 106. As an example, the controller 136 may initiate motion of the manipulator 106 in response to a command from a user or from an automated control system. The command may, for example, direct that the manipulator 106 pick up an object (e.g., by engagement of the end effector 134 with the object) and move it into or out of the vehicle 100. As an example, the controller 136 may determine a motion plan for causing engagement of the end effector 134 with the object, for transporting the object to a desired location (e.g., placed on the ground outside of the vehicle 100), and for releasing the object by disengaging the end effector 134. The controller 136 may exercise control over the position of the end effector 134 by sending control signals to the actuated joints 132, the actuator 114 of the closure structure 110, and/or the end effector 134 (e.g., control signals that cause engagement and disengagement). The controller 136 may use sensor signals obtained from the sensors 116 that are associated with the closure structure 110 while controlling motion of the manipulator 106.

Figure 2:
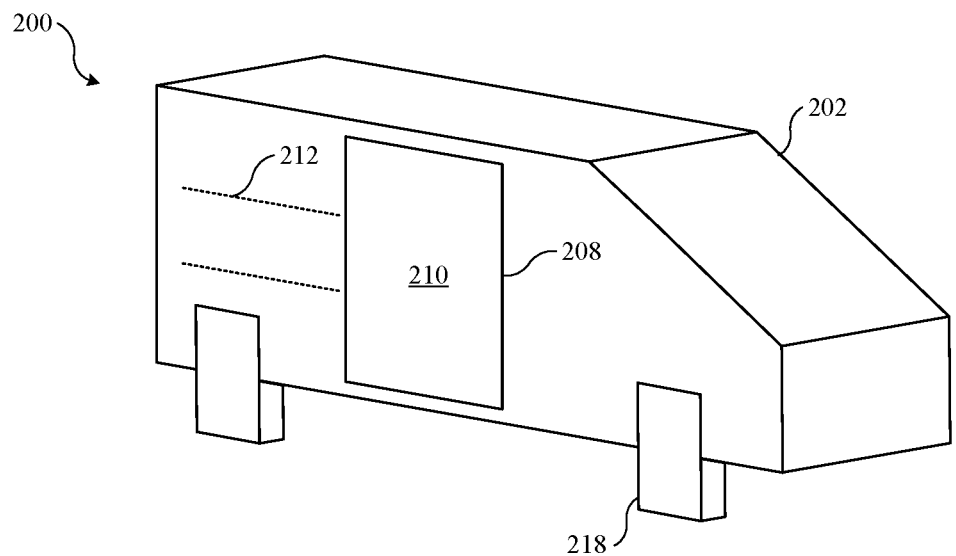
FIG. 2 is a perspective view illustration that shows a vehicle that includes a manipulator that is mounted to a sliding door in a closed position.
Figure 3:
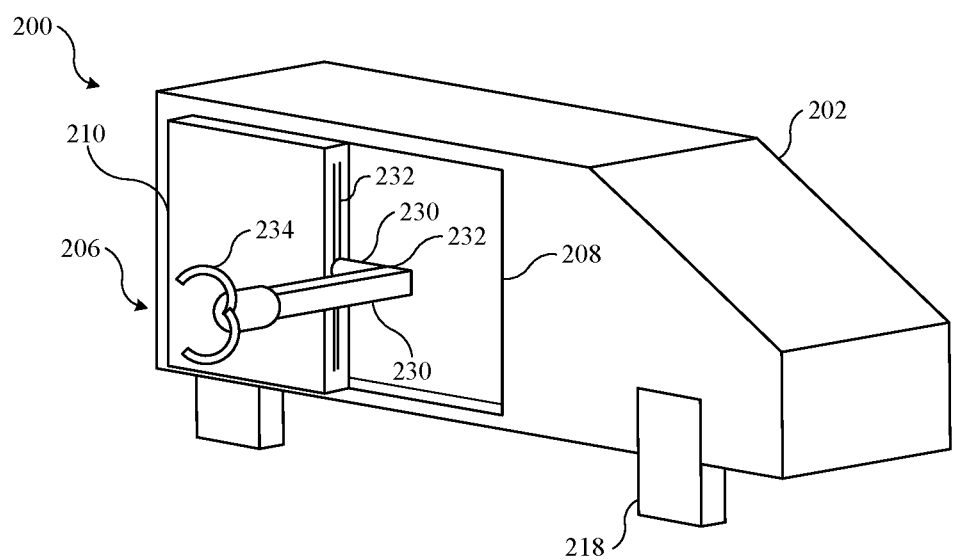
FIG. 3 is a perspective view illustration that shows the vehicle of FIG. 2 with the sliding door in an open position.

FIG. 2 is a perspective view illustration that shows a vehicle 200 that includes a manipulator 206 that is mounted to a sliding door 210 in a closed position. FIG. 3 is a perspective view illustration that shows the vehicle 200 with the sliding door 210 in an open position. The vehicle 200 is an implementation of the vehicle 100 of FIG. 1, and the description of the vehicle 100 is hereby incorporated in the description of the vehicle 200 and is applicable except as noted herein.

The vehicle 200 includes a vehicle body 202 that is supported by wheels 218. An opening 208 is defined in the vehicle body 202 (e.g., in a side area of the vehicle body in the illustrated example) and the sliding door 210 is movable between open and closed positions relative to the opening 208 using a track assembly 212 and associated actuators and sensors. Actuators and sensors that are associated with the sliding door 210 and the track assembly 212 are also used to cause and control motion of the manipulator 206.

The manipulator 206 is connected to and supported by the sliding door 210. In the illustrated example, the manipulator includes actuated joints 232 such as a translational (sliding) joint that allows vertical motion of the manipulator 206 up and down the door. The manipulator 206 may also be configured to rotate into the interior of the vehicle 200 when it is not in use, to allow the sliding door 210 to move to the closed position (FIG. 2). The manipulator 206 includes multiple arm portions 230 and the actuated joints 232 include rotational joints that interconnect the arm portions 230. The manipulator 206 also includes an end effector 234 that is configured to pick up and release objects. As an example, end effector 234 of the manipulator 206 may include jaws that move between clamped and unclamped positions, an electromagnet that can be switched between energized and deenergized states, or a suction gripper that may be switched between a first state in which suction is applied and a second state in which suction is released. The end effector 234 may be located at an outer end of the manipulator 206, and may be connected to one of the arm portions 230 or to one of the actuated joints 232.

During movement of the manipulator 206 (e.g., to position the end effector 234 with respect to an object or to move an object) while the sliding door 210 is in the open position (FIG. 3), the position of the sliding door 210 can be controlled by moving it along the track assembly 212. This allows the position of the manipulator 206 to be changed relative to the longitudinal (i.e., front-to-back) direction of the vehicle 200, thereby providing an additional axis of motion along which the position of the manipulator 206 and the end effector 234 may be controlled.

Figure 4:
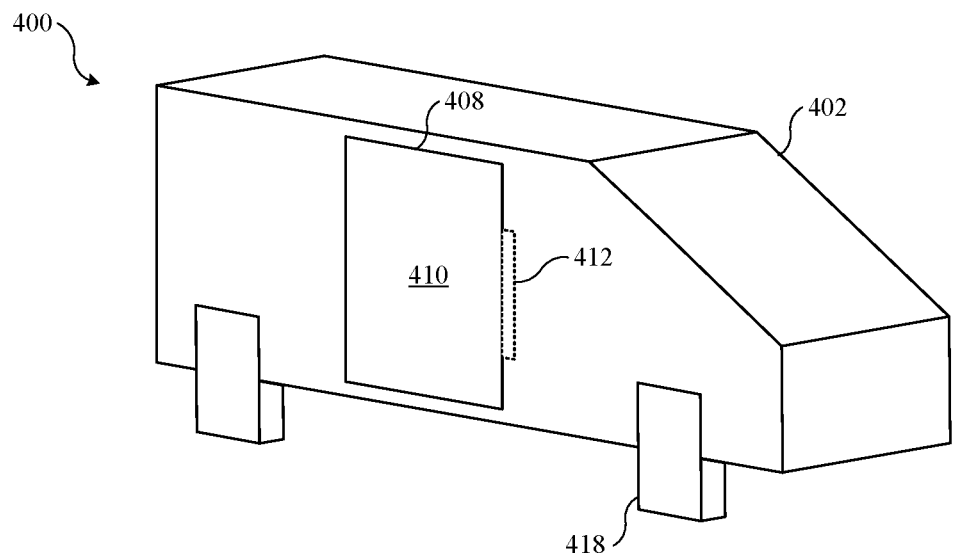
FIG. 4 is a perspective view illustration that shows a vehicle that includes a manipulator that is mounted to a pivoting door in a closed position.
Figure 5:
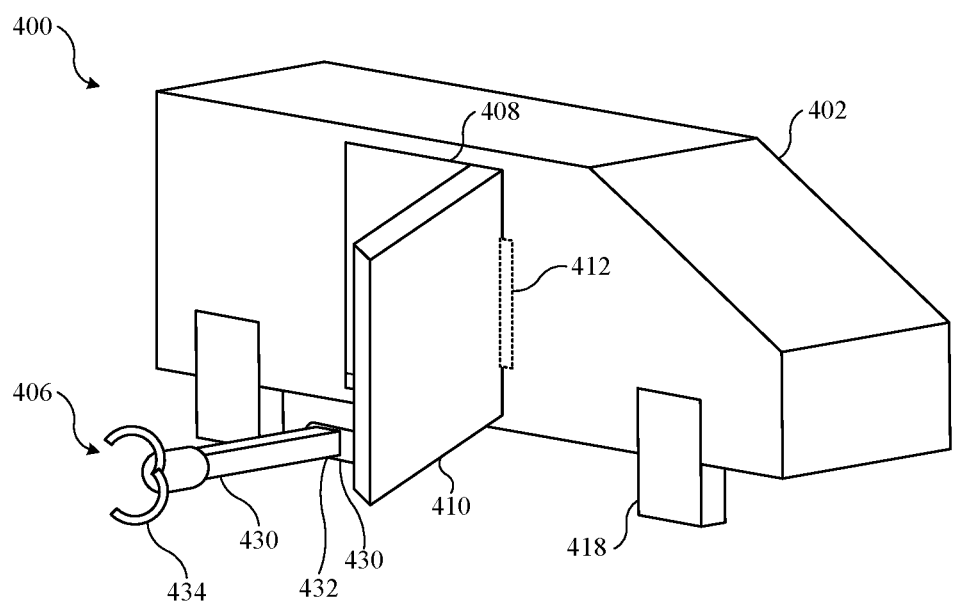
FIG. 5 is a perspective view illustration that shows the vehicle of FIG. 4 with the pivoting door in an open position.

FIG. 4 is a perspective view illustration that shows a vehicle 400 that includes a manipulator 406 that is mounted to a pivoting door 410 in a closed position. FIG. 5 is a perspective view illustration that shows the vehicle 400 with the pivoting door 410 in an open position. The vehicle 400 is an implementation of the vehicle 100 of FIG. 1, and the description of the vehicle 100 is hereby incorporated in the description of the vehicle 400 and is applicable except as noted herein.

The vehicle 400 includes a vehicle body 402 that is supported by wheels 418. An opening 408 is defined in the vehicle body 402 (e.g., in a side area of the vehicle body in the illustrated example), and the pivoting door 410 is movable between open and closed positions relative to the opening 408 using a pivoting hinge 412 that allows rotation of the pivoting door 410 relative to the vehicle body 402. Actuators and sensors that are associated with the pivoting door 410 and the pivoting hinge 412 are also used to cause and control motion of the manipulator 406.

The manipulator 406 is connected to and supported by the pivoting door 410. In the illustrated example, the manipulator 406 includes actuated joints 432 such as translational and/or rotational joints that allow motion of the manipulator 406. The manipulator 406 may also be configured to rotate into the interior of the vehicle 400 when it is not in use, to allow the pivoting door 410 to move to the closed position (FIG. 4). The manipulator 406 includes multiple arm portions 430, and the actuated joints 432 include rotational joints that interconnect the arm portions 430. The manipulator 406 also includes an end effector 434 that is configured to pick up and release objects. As an example, the end effector 434 of the manipulator 406 may include jaws that move between clamped and unclamped positions, an electromagnet that can be switched between energized and deenergized states, or a suction gripper that may be switched between a first state in which suction is applied and a second state in which suction is released. The end effector 434 may be located at an outer end of the manipulator 406, and may be connected to one of the arm portions 230 or to one of the actuated joints 432.

During movement of the manipulator 406 (e.g., to position the end effector 434 with respect to an object or to move an object) while the pivoting door 410 is in the open position (FIG. 5), the position of the pivoting door 410 can be controlled by pivoting it around the pivoting hinge 412. This allows the position of the manipulator 406 to be changed relative to the longitudinal (i.e., front-to-back) direction of the vehicle 400 and the lateral (side-to-side) direction of the vehicle 400, thereby providing an additional axis of motion with respect to which the position of the manipulator 406 and the end effector 434 may be controlled.

Figure 6:
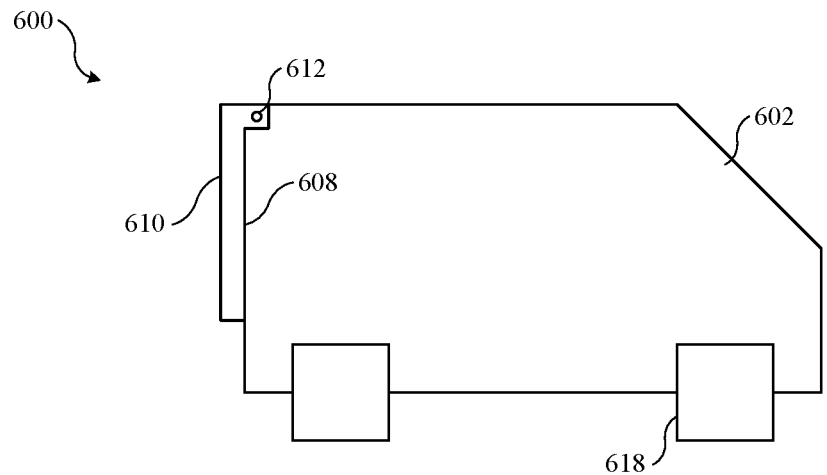
FIG. 6 is a side view illustration that shows a vehicle that includes a manipulator that is mounted to a liftgate in a closed position.
Figure 7:
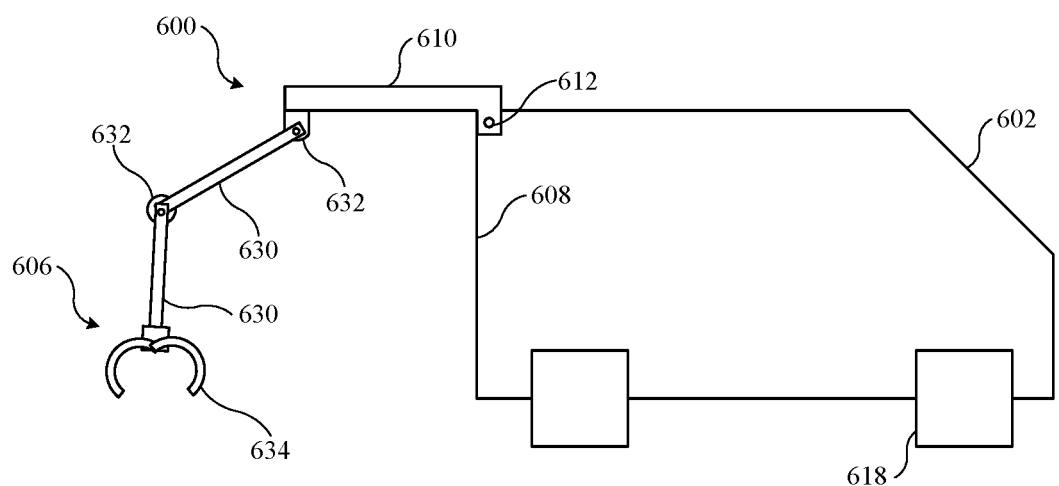
FIG. 7 is a side view illustration that shows the vehicle of FIG. 6 with the liftgate in an open position.

FIG. 6 is a side view illustration that shows a vehicle 600 that includes a manipulator 606 that is mounted to a liftgate 610 in a closed position. FIG. 7 is a side view illustration that shows the vehicle 600 with the liftgate 610 in an open position. The vehicle 600 is an implementation of the vehicle 100 of FIG. 1, and the description of the vehicle 100 is hereby incorporated in the description of the vehicle 600 and is applicable except as noted herein.

The vehicle 600 includes a vehicle body 602 that is supported by wheels 618. An opening 608 is defined in the vehicle body 602 (e.g., at the rear of the vehicle body in the illustrated example), and the liftgate 610 is movable between open and closed positions relative to the opening 608 using a pivoting hinge 612 that is positioned above the liftgate 610 and extends in a lateral (i.e., side-to-side) direction of the vehicle 600 to allow rotation of the liftgate 610 relative to the vehicle body 602. Actuators and sensors that are associated with the liftgate 610 and the pivoting hinge 612 are also used to cause and control motion of the manipulator 606.

The manipulator 606 is connected to and supported by the liftgate 610. In the illustrated example, the manipulator includes actuated joints 632 such as translational and/or rotational joints that allow motion of the manipulator 606. The manipulator 606 may also be configured to rotate into the interior of the vehicle 600 when it is not in use, to allow the liftgate 610 to move to the closed position (FIG. 6). The manipulator 606 includes multiple arm portions 630, and the actuated joints 632 include rotational joints that interconnect the arm portions 630. The manipulator 606 also includes an end effector 634 that is configured to pick up and release objects. As an example, the end effector 634 of the manipulator 606 may be a mechanical gripper that includes jaws that move between clamped and unclamped positions, an electromagnetic gripper that can be switched between energized and deenergized states, or a pneumatic (i.e, suction) gripper that may be switched between a first state in which suction is applied and a second state in which suction is released. The end effector 634 may be located at an outer end of the manipulator 606, and may be connected to one of the arm portions 630 or to one of the actuated joints 632.

During movement of the manipulator 606 (e.g., to position the end effector 634 with respect to an object or to move an object) while the liftgate 610 is in the open position (FIG. 7), the position of the liftgate 610 can be controlled by pivoting it around the pivoting hinge 612. This allows the position of the manipulator 606 to be changed relative to the vehicle body 602, thereby providing an additional axis of motion with respect to which the position of the manipulator 606 and the end effector 634 may be controlled.

Figure 8:
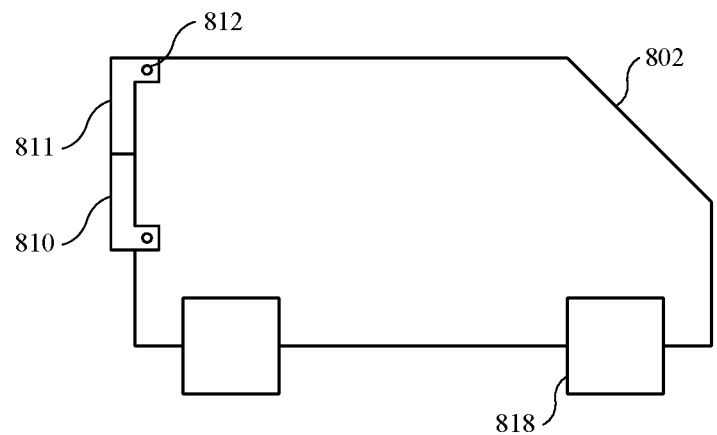
FIG. 8 is a side view illustration that shows a vehicle that includes a manipulator that is mounted to a lower portion of a split tailgate in a closed position.
Figure 9:
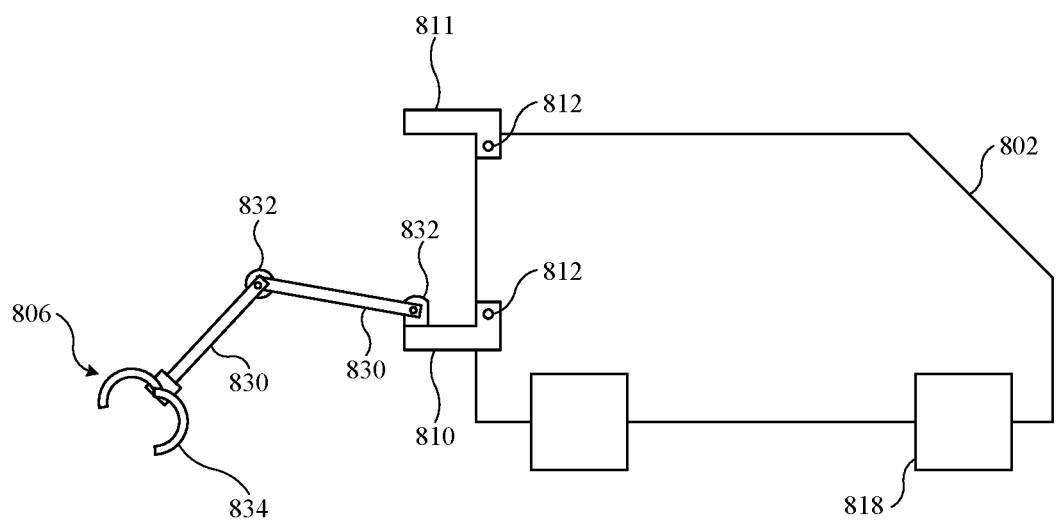
FIG. 9 is a side view illustration that shows the vehicle of FIG. 8 with the split tailgate in an open position.

FIG. 8 is a side view illustration that shows a vehicle 800 that includes a manipulator 806 that is mounted to a lower portion 810 of a split tailgate, with the lower portions 810 and an upper portion 811 of the split tailgate in a closed position. FIG. 9 is a side view illustration that shows the vehicle 800 with the lower portion 810 of the split tailgate in an open position. The vehicle 800 is an implementation of the vehicle 100 of FIG. 1, and the description of the vehicle 100 is hereby incorporated in the description of the vehicle 800 and is applicable except as noted herein.

The vehicle 800 includes a vehicle body 802 that is supported by wheels 818. An opening 808 is defined in the vehicle body 802 (e.g., at the rear of the vehicle body in the illustrated example). The lower portion 810 and the upper portion 811 of the split tailgate are each movable between open and closed positions relative to the opening 808 using hinges 812 that are configured to allow pivoting and are positioned below the lower portion 810 and above the upper portion 811 and extend in a lateral (i.e., side-to-side) direction of the vehicle 800 to allow rotation of the lower portion 810 and the upper portion 811 of the split tailgate relative to the vehicle body 802. Actuators and sensors that are associated with the lower portion 810, the upper portion 811, and the pivoting hinge 812 are also used to cause and control motion of the manipulator 806.

The manipulator 806 is connected to and supported by the lower portion 810 of the split tailgate. In the illustrated example, the manipulator includes actuated joints 832 such as translational and/or rotational joints that allow motion of the manipulator 806. The manipulator 806 may also be configured to rotate into the interior of the vehicle 800 when it is not in use, to allow the lower portion 810 to move to the closed position (FIG. 8). The manipulator 806 includes multiple arm portions 830, and the actuated joints 832 include rotational joints that interconnect the arm portions 830. The manipulator 806 also includes an end effector 834 that is configured to pick up and release objects. As an example, the end effector 834 of the manipulator 806 may be a mechanical gripper that includes jaws that move between clamped and unclamped positions, an electromagnetic gripper that can be switched between energized and deenergized states, or a pneumatic (i.e., suction) gripper that may be switched between a first state in which suction is applied and a second state in which suction is released. The end effector 834 may be located at an outer end of the manipulator 806, and may be connected to one of the arm portions 830 or to one of the actuated joints 832.

During movement of the manipulator 806 (e.g., to position the end effector 834 with respect to an object or to move an object) while the lower portion 810 is in the open position (FIG. 9), the position of the lower portion 810 can be controlled by pivoting it around the pivoting hinge 812. This allows the position of the manipulator 806 to be changed relative to the vehicle body 802, thereby providing an additional axis of motion with respect to which the position of the manipulator 806 and the end effector 834 may be controlled.

Figure 10:
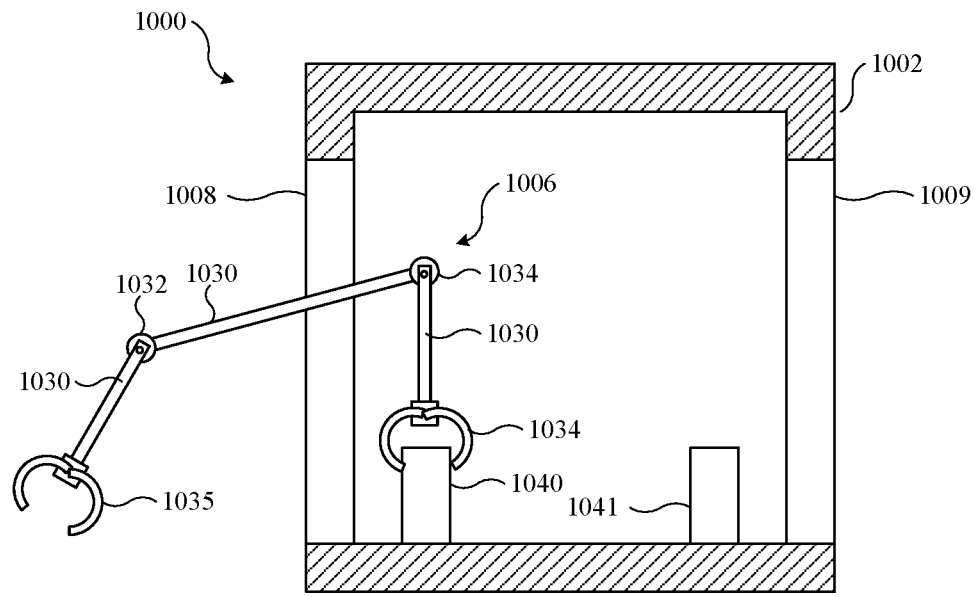
FIG. 10 is a perspective view illustration that shows a vehicle that has a vehicle body and a manipulator in a first configuration.
Figure 11:
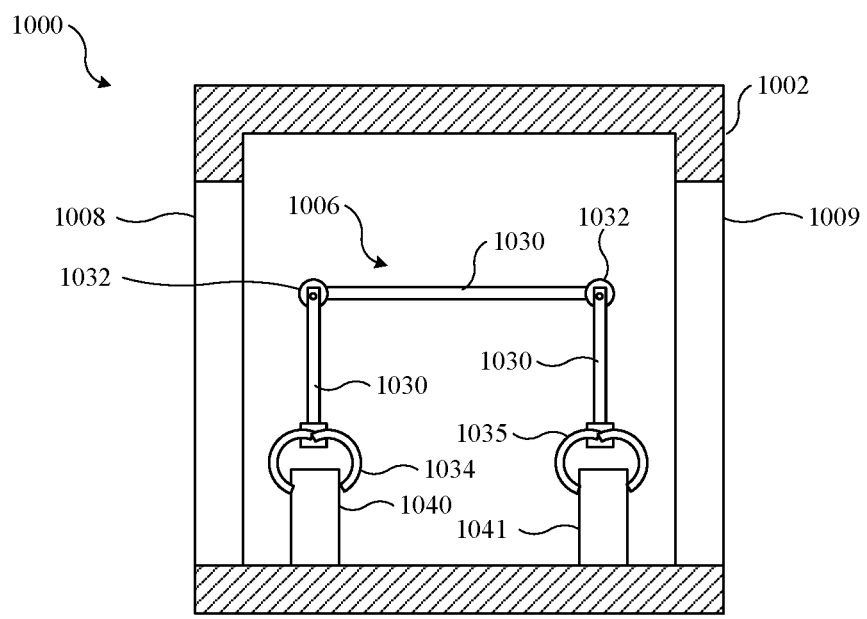
FIG. 11 is a perspective view illustration that shows a vehicle that has a vehicle body and a manipulator in an intermediate configuration.
Figure 12:
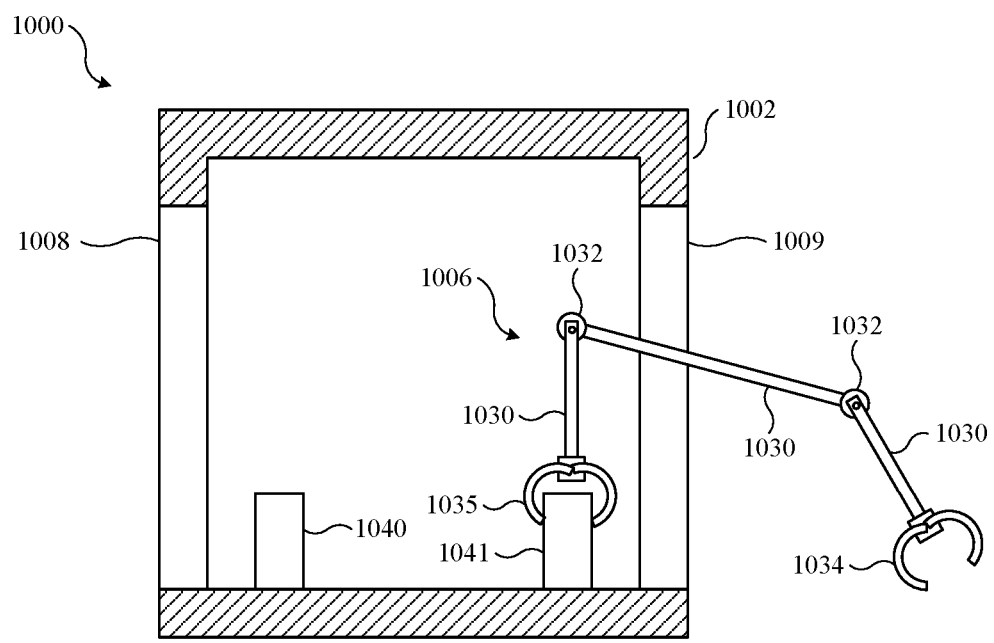
FIG. 12 is a perspective view illustration that shows a vehicle that has a vehicle body and a manipulator in a second configuration.

FIG. 10 is a cross-section illustration that shows a vehicle 1000 that has a vehicle body 1002 and a manipulator 1006 in a first configuration. The vehicle 1000 is similar to the vehicle 100 except as otherwise described herein. FIG. 11 is a cross-section illustration that shows the manipulator 1006 in an intermediate configuration. FIG. 12 is a cross-section illustration that shows the manipulator 1006 in a second configuration.

The vehicle 1000 includes a first mounting structure 1040 and a second mounting structure 1041. The first mounting structure 1040 and the second mounting structure 1041 are each connected to the vehicle body 1002. In the illustrated example, vehicle body 1002 includes a first opening 1008 and a second opening 1009 (e.g., door openings). The first mounting structure 1040 is positioned adjacent to the first opening 1008 and the second mounting structure 1041 is positioned adjacent to the second opening 1009.

The vehicle 1000 includes a manipulator 1006. The manipulator 1006 may include one or more arm portions 1030, one or more actuated joints 1032 that interconnect the arm portions 1030, a first end effector 1034, and a second end effector 1035.

The first end effector 1034 and the second end effector 1035 are configured to pick up and release objects. As an example, first end effector 1034 and the second end effector 1035 of the manipulator 1006 may each be a mechanical gripper that includes jaws that move between clamped and unclamped positions, an electromagnetic gripper that can be switched between energized and deenergized states, or a pneumatic (i.e., suction) gripper that may be switched between a first state in which suction is applied and a second state in which suction is released. The first end effector 1034 and the second end effector 1035 are each located at an outer end of the manipulator 1006, and may be connected to one of the arm portions 230 or to one of the actuated joints 232. Thus, the first end effector 1034 and the second end effector 1035 are located at opposite ends of the manipulator 1006.

The first end effector 1034 and the second end effector 1035 are each configured to be connected to one of the first mounting structure 1040 or the second mounting structure 1041. This allows the manipulator 1006 to move between a first configuration and a second configuration.

As one example, in an implementation in which the first end effector 1034 and the second end effector 1035 are mechanical grippers, the first mounting structure 1040 and the second mounting structure 1041 may each be structures that are configured to be securely grasped by mechanical grippers. As another example, in an implementation in which the first end effector 1034 and the second end effector 1035 are electromagnetic grippers, the first mounting structure 1040 and the second mounting structure 1041 may each be ferromagnetic structures that are configured to allow a secure connection by establishing an electromagnetic attraction force with respect to the electromagnetic grippers. As another example, in an implementation in which the first end effector 1034 and the second end effector 1035 are pneumatic grippers, the first mounting structure 1040 and the second mounting structure 1041 may each be structures that are configured to be securely grasped by pneumatic grippers, for example, by including surfaces on which suction forces can be developed by the pneumatic grippers.

In the first configuration (FIG. 10), the first end effector 1034 is connected to the first mounting structure 1040 and the second end effector 1035 is able to pick up and release objects. To move from the first configuration to the second configuration, the manipulator moves to an intermediate configuration (FIG. 11) in which the first end effector 1034 remains connected to the first mounting structure 1040, and the second end effector 1035 is moved into a connected position with respect to the second mounting structure 1041. The first end effector 1034 then disconnects from the first mounting structure 1040 to define the second configuration. In the second configuration, the second end effector 1035 is connected to the second mounting structure 1041 and the first end effector 1034 is able to pick up and release the objects.

As an example, in the first configuration, the manipulator 1006 may be connected to the first mounting structure 1040 using the first end effector 1034 so that it is able to extend out of the first opening 1008 and grasp objects using the second end effector 1035. In the second configuration, the manipulator 1006 may be connected to the second mounting structure 1041 using the second end effector 1035 so that it is able to extend out of the second opening 1009 and grasp objects using the first end effector 1034.

Figure 13:
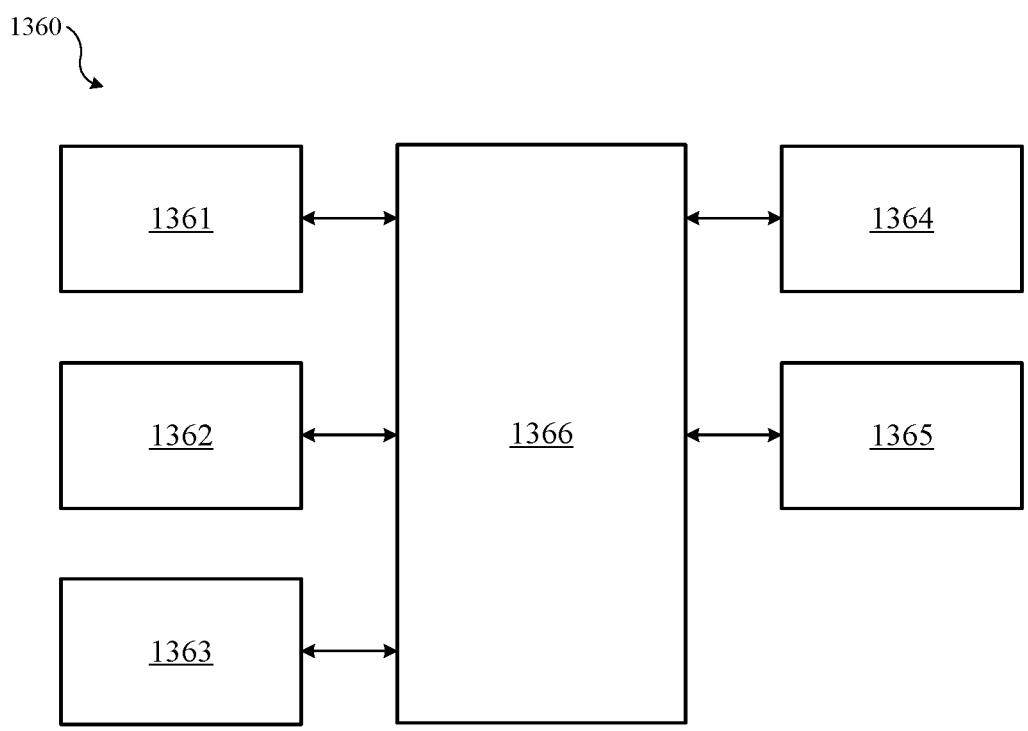
FIG. 13 is a block diagram that shows an example of a hardware configuration for a computing device.

FIG. 13 is an illustration that shows an example of a hardware configuration for a computing device that can be used to implement the systems described herein, such as controllers that are operable to guide operation of manipulators based on commands and sensor signals. The computing device 1360 may include a processor 1361, a memory 1362, a storage device 1363, one or more input devices 1364, and one or more output devices 1365. The computing device 1360 may include a bus 1366 or a similar device to interconnect the components for communication. The processor 1361 is operable to execute computer program instructions and perform operations described by the computer program instructions. As an example, the processor 1361 may be a conventional device such as a central processing unit. The memory 1362 may be a volatile, high-speed, short-term information storage device such as a random-access memory module. The storage device 1363 may be a non-volatile information storage device such as a hard drive or a solid-state drive. The input devices 1364 may include any type of human-machine interface such as buttons, switches, a keyboard, a mouse, a touchscreen input device, a gestural input device, or an audio input device. The output devices 1365 may include any type of device operable to provide an indication to a user regarding an operating state, such as a display screen or an audio output.

As described above, one aspect of the present technology is the gathering and use of data available from various sources to move objects into and out of vehicles. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver an object to a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of package delivery services, the present technology can be configured to allow users to select to "opt in" or "opt out" of participation in the collection of personal information data during registration for services or anytime thereafter. In another example, users can select not to provide certain types of personal information for package delivery services. In yet another example, users can select to limit the length of that personal information is maintained or entirely prohibit the collection and/or storage of personal information. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, objects can be loaded into a vehicle through a manually-initiated process.

What is claimed is:

1. A vehicle comprising:
a vehicle body;
an opening defined in the vehicle body;
a closure structure;
a support structure that connects the closure structure to the vehicle body such that the closure structure is movable with respect to the vehicle body between a closed position in which the closure structure obstructs the opening and an open position in which the closure structure does not obstruct the opening;
an actuator that is operable to cause motion of the closure structure with respect to the vehicle body;
a manipulator that is connected to the closure structure and includes arm portions that are connected by actuated joints that are operable to move the arm portions with respect to each other and an end effector that is configured to pick up and release objects;
sensors that output sensor signals; and
a controller that is configured to position the end effector relative to an object by causing motion of the closure structure to move the manipulator relative to the vehicle body based in part on the sensor signals and by moving the end effector relative to the closure structure by causing motion of the manipulator.

2. The vehicle of claim 1, wherein the closure structure is pivotally connected to the vehicle body.

3. The vehicle of claim 1, wherein the closure structure is slidably connected to the vehicle.

4. The vehicle of claim 1, wherein the actuated joints are operable to rotate the arm portions with respect to each other.

5. The vehicle of claim 1, wherein the actuated joints are operable to translate the arm portions with respect to each other.

6. A vehicle comprising:
a vehicle body;
an opening defined in the vehicle body;
a closure structure that is operable to move between open and closed positions with respect to the opening;
an actuator that is operable to cause motion of the closure structure with respect to the vehicle body; and
a manipulator that is connected to the closure structure and includes an end effector that is configured to pick up and release objects; and
a controller that is configured to position the end effector relative to an object by causing motion of the closure structure to move the manipulator relative to the vehicle body and by moving the end effector relative to the closure structure by causing motion of the manipulator.

7. The vehicle of claim 6, wherein moving the end effector via motion of the closure structure provides an additional degree of freedom for moving the end effector relative to motion of the manipulator.

8. The vehicle of claim 6, further comprising:
sensors associated with the closure structure, wherein the controller is operable to control motion of the end effector based in part on sensor signals that are received from the sensors.

9. The vehicle of claim 6, wherein the closure structure is pivotally connected to the vehicle body.

10. The vehicle of claim 6, wherein the closure structure is slidably connected to the vehicle.

11. The vehicle of claim 6, wherein the manipulator includes arm portions that are connected by actuated joints that are operable to move the arm portions with respect to each other.

12. The vehicle of claim 11, wherein the actuated joints are operable to rotate the arm portions with respect to each other.

13. The vehicle of claim 11, wherein the actuated joints are operable to translate the arm portions with respect to each other.

14. The vehicle of claim 6, wherein the end effector is a mechanical gripper.

15. The vehicle of claim 6, wherein the end effector is an electromagnetic gripper.

16. The vehicle of claim 6, wherein the end effector is a pneumatic gripper.

17. The vehicle of claim 6, wherein the closure structure is a door.

18. The vehicle of claim 6, wherein the closure structure is a tailgate.

19. The vehicle of claim 6, wherein the closure structure is a liftgate.

20. A vehicle comprising:
a vehicle body, the vehicle body having a first opening on a first side of the vehicle body and a second opening on a second side of the vehicle body, the vehicle body having a void that extends therethrough from the first opening to the second opening;
a first mounting structure that is connected to the vehicle body adjacent to the first opening;
a second mounting structure that is connected to the vehicle body adjacent to the second opening; and
a manipulator that includes a first end effector having a first gripper, a second end effector having a second gripper, at least one arm portion that couples the first end effector to the second end effector, and actuated joints that are operable to move the at least one arm portion and the first and second end effectors with respect to each other,
wherein the manipulator is moveable between a first configuration in which the first gripper grips the first mounting structure to mount the manipulator to the vehicle body such that the manipulator is able to extend out of the first opening and the second end effector is able to pick up and release objects, and a second configuration in which the second gripper grips the second mounting structure to mount the manipulator to the vehicle body such that the manipulator is able to extend out of the second opening and the first end effector is able to pick up and release the objects.

21. The vehicle of claim 1, wherein moving the end effector via motion of the closure structure provides an additional degree of freedom for moving the end effector relative to motion of the manipulator.

* * * * *